April 9, 1940. H. WIPPERMAN 2,196,241
HOSE SUPPORTER
Filed June 26, 1937 2 Sheets-Sheet 2
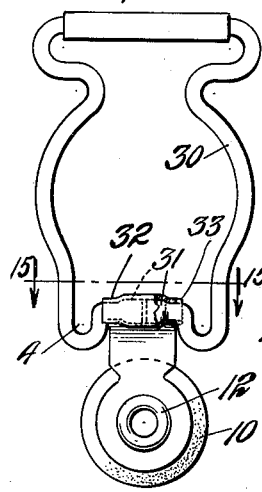
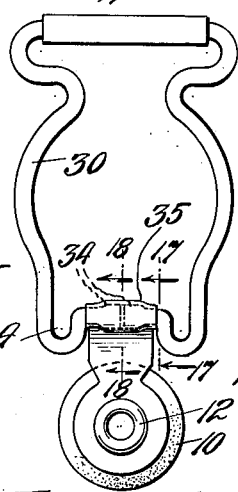
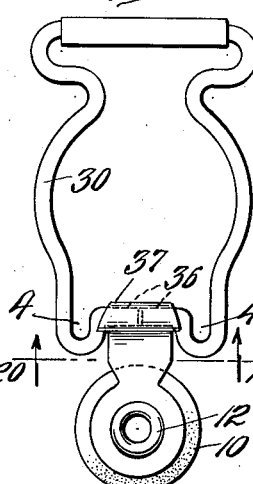
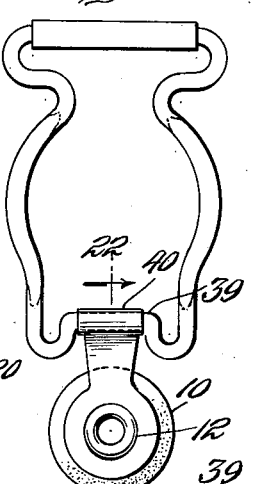
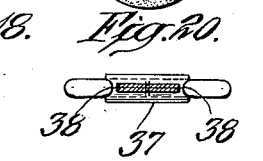
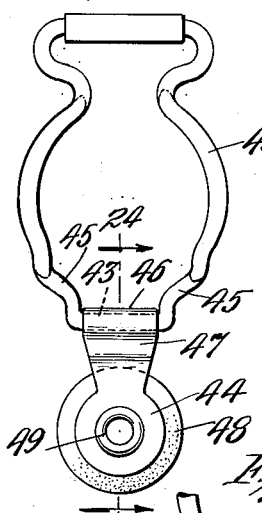
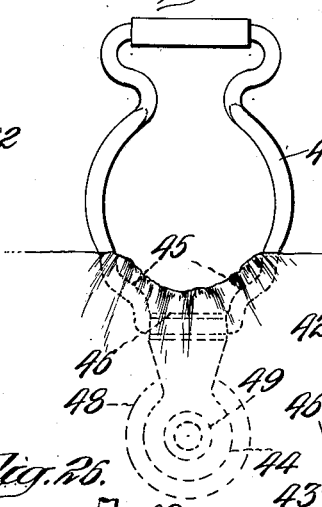
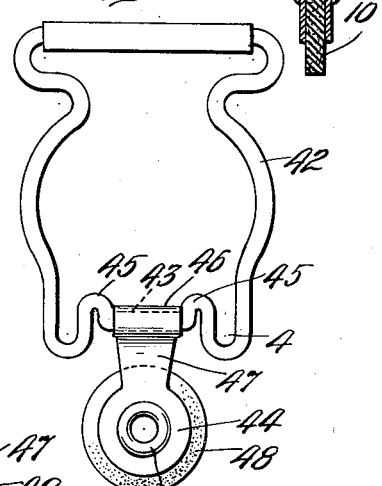
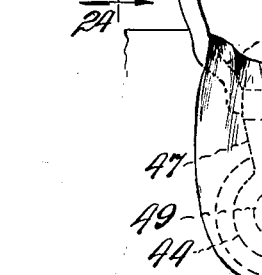
INVENTOR
HILDEGARD WIPPERMAN
BY Sager & Malcolm
ATTORNEYS Patented Apr. 9, 1940

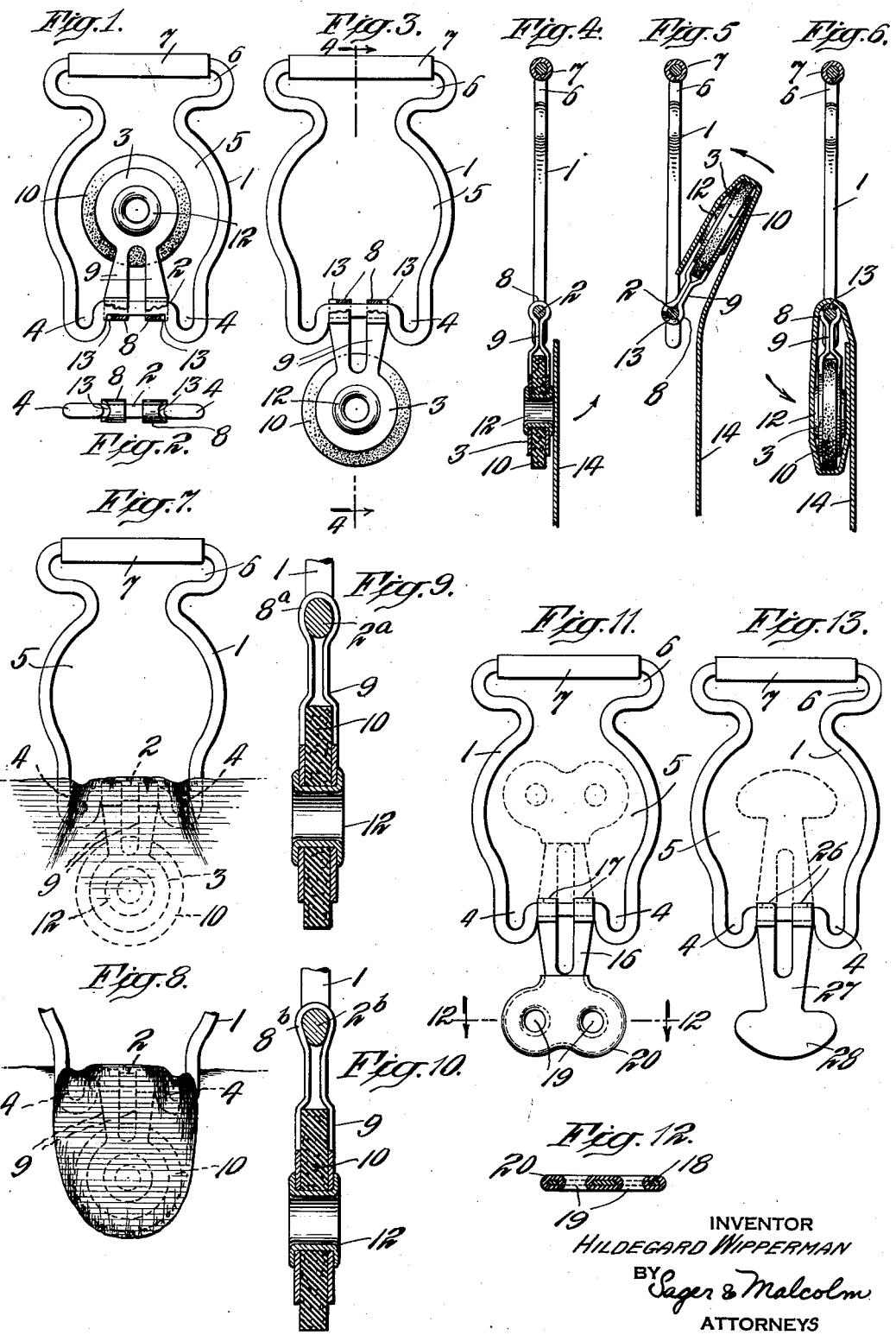

2,196,241

UNITED STATES PATENT OFFICE 2,196,241

HOSE SUPPORTER

Hildegard Wipperman, Chicago, Ill., assignor to The H. W. Gossard Co., Chicago, Ill., a corporation of Illinois Application June 26, 1937, Serial No. 150,528

11 Claims. (Cl. 24—243)

This invention relates to supporters for hosiery and other fabrics and is, in part, a continuation of application Serial No. 84,804, filed June 12, 1936.

The principal object of this invention is to provide a simple and inexpensive run-proof supporter which is easy to attach and detach and entirely eliminates the undesired bulky appearance of present-day supporters.

Another object of the invention is to provide an efficient hose supporter which will lie absolutely flat and invisible under outer garments and will not damage the hose or become disengaged therefrom under normal wearing conditions.

Still another object is to provide an improved latching means for holding my supporter in fastened position so as to prevent accidental opening.

My improved supporter, which accomplishes the foregoing objects, comprises a bail or frame carrying a pendant tongue which is pivoted thereto so as to swing through the frame. The upper or pivoted end of the tongue forms a surface over which the fabric passes for support. The lower or free end of the tongue is preferably provided with an enlarged head made of rubber or other soft friction material capable of gripping the fabric without injury thereto. In one embodiment of the invention the lower end of the frame is formed with recessed supporting surfaces on opposite sides of the tongue which assist the tongue in supporting and distributing the stress over the fabric, while in another modification the lower end of the frame is provided with specially shaped sloping surfaces which perform a similar function. In all forms of the invention I also provide an improved latching means for holding the tongue of the supporter in fastened position and preventing accidental opening.

In attaching the supporter, the depending tongue is placed beneath the upper edges of the hose and is swung forwardly and upwardly and then back through the frame to its original depending position, thus causing the fabric to be gripped and passed over the upper or hub surface of the tongue and over the side supporting surfaces of the frame as described above. Important advantages of my supporter are its simplicity and ease of adjustment, its ability to hold the fabric firmly and distribute the strain uniformly thereover in such a way as to avoid runs even under strenuous conditions of use, and its ability to lie flat and invisible beneath the sheerest outer garments.

These and other features and advantages of the invention will be apparent from the following description taken in connection with the accompanying drawings, in which:

Fig. 1 is a front elevation of a supporter embodying the invention;

Fig. 2 is an end view showing the lower end of the supporter frame carrying the pivoted tongue;

Fig. 3 is a view similar to Fig.1, but with the tongue in depending position;

Fig. 4 is a vertical section taken on line 4—4 of Fig. 3, showing the first step of connecting the supporter to the fabric or hose;

Fig. 5 is a similar view showing the direction of movement of the supporter tip in fastening same to the fabric;

Fig. 6 is a similar view showing the parts in the final supporting position;

Fig. 7 is a front elevation showing the device supporting the fabric;

Fig. 8 is a reverse or rear view of Fig. 7;

Figs. 9 and 10 are vertical sectional views illustrating two different modifications of the latching means for holding the tongue of the supporter in fastened position;

Fig. 11 is a front elevation showing a modification in the construction of the tongue;

Fig. 12 is a detail sectional view taken on the line 12—12 of Fig. 11;

Fig. 13 is a view similar to Figs 3 and 11, showing still another modification in the construction of the tongue;

Fig. 14 is a front elevation showing another modification of the invention;

Fig. 15 is a transverse section taken on line 15—15 of Fig. 14;

Fig. 16 is a view similar to Fig. 14, showing a modification of the latching means for holding the tongue in fastened position;

Fig. 17 is a transverse section taken on line 17—17 of Fig. 16;

Fig. 18 is a similar section taken on line 18—18 of Fig. 16;

Fig. 19 is a front elevation showing another modification of the invention;

Fig. 20 is a transverse section through the tongue on line 20—20 of Fig. 19;

Fig. 21 is a front elevation showing another modification of the invention;

Fig. 22 is a vertical section through the tongue on line 22—22 of Fig. 21;

Fig. 23 is a front elevation showing another modification of the invention;

Fig. 24 is a vertical section through the tongue on line 24—24 of Fig. 23;

Fig. 25 is a front elevation showing the device of Fig. 23 supporting the fabric;

Fig. 26 is a reverse or rear view of Fig. 25; and

Fig. 27 is a front elevation showing still another modification of the invention.

The invention is shown in Figs. 1 to 8 as embodied in a hose supporter comprising a bail or frame 1 in the form of a closed wire loop having a substantially straight lower axle or bearing portion 2 upon which the tongue 3 is pivoted; and U-shaped depressions or recessed portions 4 on opposite sides thereof. The frame extends upwardly from the depressions 4 and bends outwardly to form a central opening or loop 5 through which the tongue can pass freely. Above the opening 5 the frame forms a second restricted bent portion 6 to receive the garter elastic or other attaching means and is closed by a metal joiner 7 which holds the free ends of the frame securely together. If desired, however, the frame may be made in a single piece by stamping or molding, in which case the joiner 7 may not be required.

The tongue 3 is formed with tubular hub or bearing portions 8 which pivotally engage the bearing portion 2 of the frame, and with an enlarged head formed by depending extensions 9 between which a disc 10 of soft rubber or other gripping material is clamped by an eyelet 12. The disc 10 provides a soft surface which will not tear the hose. The tubular bearing portions 8 of the bifurcated tongue extension 9 abuts against the lower loop of the frame forming the recessed portions 4 so that, when the tongue is in the depending position shown in Fig. 3, the outer edges of the tubular bearing portions 8 strike against these lower looped edges of the frame and frictionally hold the tongue in this depending position, which is the position assumed when fastened to the fabric or hose as hereinafter described. However, when the tongue is swung to the upward position shown in Fig. 1, notches 13 formed at the bends in the upper outer edges of tubular bearing portions 8 allow the edges of bearings 8 to clear the loops 4 so that the tongue is loose on its bearing 2 when in the upper position shown in Fig. 1. This latching effect will be seen from Figs. 1, 2 and 3, it being evident that the tongue is loose and easily depressed when in the upper position of Fig. 1 because notches 13 permit bearings 8 to slide laterally on bearing 2 of the frame in this position, whereas, with the tongue in the depending position of Fig. 3, the lower unnotched edges of bearings 8 strike against the adjacent edges of loops 4 to produce the latching effect just described.

In attaching the above-described supporter to the fabric or hose, the pendant tongue 3 is placed beneath the upper edge of the fabric 14 as shown in Fig. 4. It is then pivoted outwardly and upwardly as indicated by the arrow in Fig. 5, and then back through the frame and downwardly to the position shown in Fig. 6. In this final position the fabric is gripped over a substantial area by the friction disc 10 and is folded inwardly over the straight bearing portions or hubs 8 of the tongue and over the depressed fabric-supporting portions 4 of the frame as shown in Figs. 6 to 8. The pull of the fabric is extended over the full width of the straight bearing portions 8 and the gathering of the fabric in the recesses 4 causes the pull to be directed angularly over a substantial area, thereby eliminating the usual direct strain on a limited part of the fabric which tends to injure the threads and cause runs. Furthermore, the supporter lies flat and is completely invisible under the outer garments. There is no tendency for the tongue to swing back and release the fabric because the pull is exerted principally on the top bearing portion 8 of the tongue and on the depressed side portions 4 of the frame. The pull which is exerted through the depressions 4, which are below the bearing portion 2, tends to hold the tongue in its depending position.

Fig. 9 shows a modification of the invention in which the axle or bearing portion 2a of the frame is elliptical, with the long diameter of the ellipse running vertically or in the plane of the frame 1, and the hub or tubular bearing portion 8a of the tongue is also elliptical and conforms exactly to the shape of the axle 2 when the tongue is in the depending position shown in Fig. 9. With this construction the extensions 9 of the tongue will exert a spring effect when the narrower diameter of the hub 8a turns in the wider diameter of the axle, from which it will be seen that the tendency is to hold the tongue in the fastened position.

Fig. 10 shows another modification of the invention which is similar to the construction shown in Fig. 9 except that the axle or bearing portion 2b of the frame is pear-shaped, having one edge, i. e., the lower edge as the supporter hangs on the figure, considerably narrower and longer than the opposite edge, and the hub or tubular bearing portion 8b is similarly shaped. With this construction the tongue is held firmly in the latched or fastened position, and the effort required to turn the tongue away from such latched position is greater than is necessary to revolve the tongue at any other point.

In the construction shown in Figs. 11 and 12 the frame 1 is similar to the frame described above and has been given corresponding reference characters. The tongue, however, comprises a single thickness of metal or other material with a neck 16 having a rolled bearing portion 17 at one end and a wide, divided head 18 at the other end. The head 18 has a pair of apertures 19 and is coated with rubber or other frictional material 20 which extends over the surface of the head 18 and into the apertures 19. The operation of this embodiment is identical with that described above in connection with Figs. 1 to 8.

In the embodiment of Fig. 13 the frame 1 is similar to that previously described and has been designated by corresponding reference characters. The tongue, however, is formed with a rolled bearing portion 26, a flat neck 27, and an enlarged convex head 28. This tongue may also have a covering of rubber or other soft surfaced material similar to the embodiment of Fig. 11.

In Figs. 14 and 15 the wire bail or frame 30 differs from those previously described in that the free ends of the wire are at the bottom or bearing portion of the frame and have their adjacent extremities enlarged as at 31. The pendant tongue in this embodiment of the invention is similar to that shown in Figs. 1-8 except that it has a continuous hub or bearing 32 which has its central portion enlarged to fit the enlarged ends 31 of the wire frame and its outer ends reduced in diameter so as to prevent the ends of the frame from spreading. This tongue has notches 33 formed in the upper outer edges of the hub 32 for the same purpose as the notches 13 described above in connection with Figs. 1-8.

In the construction shown in Figs. 16 to 18 the axle or bearing portion of the frame is similar to that of Figs. 14 and 15 except that the enlarged knob-like ends 34 are elliptical, with the long diameter of the ellipse running vertically or in the plane of the frame 30 as shown in Fig. 18. The hub or bearing 35 of the pendant tongue likewise has its central portion elliptical and conforms to the shape of the enlarged ends 34 of the frame when the tongue is in the depending position shown in Figs. 16 and 18. In this device the sides of the tongue will exert a spring effect when the narrower elliptical diameter of the hub 35 turns in the wider diameter of the elliptical ends 34 of the frame, so that the tendency is to hold the tongue in the depending position.

In the embodiment of Figs. 19 and 20 the free ends 36 of the frame 30 are of uniform diameter, forming an ordinary tubular bearing surface for the hub 37 of the depending tongue. In this construction, however, notches 38 are formed in the lower outer edges of the tubular hub 37 so that these notches will engage the adjacent edges of the depressions 4 of the frame 30 when the pivoted tongue is in the depending position shown in Fig. 19, thus locking the tongue in this position. In order to insure a positve locking action I prefer to make the frame 30 of a material such as spring metal with the vertical sides of the frame flexed inwardly so as to force the parts into locking engagement when the tongue is moved to the depending position shown in Fig. 19.

In Figs. 21 and 22 the frame has a lower cylindrical bearing portion or axle 39 exactly as in Figs. 1 to 8, and the pendant tongue has a tubular bearing portion or hub 40. In this embodiment, however, the latching effect is obtained by making the normal diameter of the hub 40 slightly smaller than that of the axle 39 and springing the hub on the axle so that there is constant friction between the two.

Figs. 23 to 24 show a modification of the invention comprising a bail or frame 42 in the form of a closed wire loop having the sides swedged flat and having a substantially straight cylindrical bearing portion or axle 43 upon which the tongue 44 is pivoted. As will be seen from Fig. 23, this frame has integral inwardly curved or sloping surfaces 45 connecting the axle 43 with the swedged sides of the frame on opposite sides of the pendant tongue 44. The tongue 44 is formed with a tubular bearing portion 46 which pivotally engages the axle 43 of the frame, and with an enlarged head formed by depending extensions 47, being in this respect similar to the construction shown in Figs. 21 and 22. Also, as in Figs. 21 and 22, in the embodiment of Figs. 23 to 26 the latching effect is obtained by making the normal diameter of the hub or bearing portion 46 of the tongue slightly smaller than that of the axle 43 so that the constant friction between the two will act as a brake and always tend to hold the tongue in any position in which it is moved. The disc 48, which is clamped to the extensions 47 of the tongue by eyelet 49, is preferably made of stamped rubber or the like having an inner layer or disc 50 of fabric as illustrated in Fig. 24, as I have found that a fabric or fibrous layer embedded in this manner materially enhances the gripping properties of the disc.

The hose supporter of Figs. 23 to 26 is operated in the same manner as the other embodiments of the invention described above. However, from Figs. 25 and 26 it will be seen that the pull of the fabric is distributed, not only over the full width of the hub or bearing portion 46 of the tongue, but also over the inwardly curved surfaces 45 of the frame 42 on opposite sides of the tongue, thereby directing the pull on the fabric outwardly over a substantial area and eliminating all direct strain on a limited part of the fabric which would tend to injure the threads and cause runs. I have found this embodiment of the invention to be particularly adapted for use with very sheer hose because the raised inwardly curved surfaces 45 of the frame raise the fabric out of contact with the extreme outer ends of the hub 46 at the point where the hub contacts with the sides of the frame, thus making it impossible for the fabric to accidentally wedge between the hub and frame which might cause the sheer fabric to become torn when the tongue is swung upon its bearing.

Fig. 27 shows a modification of the invention which is a combination of the construction shown in Figs. 23 to 26 and that shown in the other views. In this embodiment of the invention the tongue is mounted on the axle 43 of the frame in exactly the same manner as in Figs. 23 to 26, and the frame has inwardly curved upwardly sloping surfaces 45 on opposite sides of the axle 43 as in Figs. 23 to 26. Outwardly of the inwardly curved surfaces 45, however, the frame has U-shaped depressions or recessed portions 4 on opposite sides thereof as in the modifications shown in Figs. 1 to 22. This construction therefore offers all the advantages of the device shown in Figs. 23 to 26 while, at the same time, the gathering of the fabric in the recesses 4 causes the pull to be directed angularly over an even greater area of the fabric and still further reduces the strain thereon.

The supporter has been described for convenience as made of metal. It may, however, be made of any other suitable material such as molded composition, hard rubber, or the like. The supporter is simple and inexpensive to manufacture and is durable and dependable in use. The frame provides a substantial bearing surface for the tongue which cannot become loose during continued use. Although certain specific embodiments have been shown for purposes of illustration it is to be understood that various changes and modifications may be made therein without departing from the scope of the invention which is to be limited only in accordance with the following claims when interpreted in view of the prior art.

The invention claimed is:

1. A fabric supporter comprising a hollow frame formed of bent wire having its free ends bent in at the bottom to form a straight bearing portion and having enlarged knobs at the adjacent extremities of said free ends, and a pendant tongue having a tubular hub engaging said bearing portion of the frame in position to swing through the frame for the purpose described, said hub having its central portion enlarged to fit the enlarged ends of said bearing portion and its outer ends reduced in diameter so as to prevent the frame from spreading.

2. A fabric supporter comprising a frame having a pendant tongue pivoted on a portion thereof to swing through the frame for the purpose described, the portions of said frame adjacent said tongue pivot extending angularly outwardly on opposite sides to form additional supporting portions for supporting and distributing the pull on the fabric.

3. A fabric supporter comprising a frame having a pendant tongue pivoted on a portion thereof to swing through the frame for the purpose described, the portions of said frame adjacent said tongue pivot extending downwardly and angularly outwardly on opposite sides and then upwardly to form recessed portion in position to support and distribute the pull on the fabric.

4. A fabric supporter comprising a frame having a straight horizontal portion, a pendant tongue having a straight bearing portion engaging said straight frame portion and pivoted thereon to swing through the frame for the purpose described, said straight bearing portion forming a support for the fabric, the portions of said frame adjacent said horizontal portion extending angularly outwardly on opposite sides to form additional supporting portions for supporting and distributing the pull on the fabric.

5. A fabric supporter comprising a frame having a straight horizontal portion, a pendant tongue having a tubular bearing portion engaging said straight horizontal portion and pivoted thereon to swing through the frame for the purpose described, said bearing portion forming a support for the fabric, said tongue having an enlarged head of frictional material, the portions of said frame adjacent said horizontal portion extending angularly outwardly on opposite sides to form additional supporting portions for supporting and distributing the pull on the fabric.

6. A fabric supporter comprising a frame having a straight horizontal portion, a pendant tongue having a tubular bearing portion engaging said straight horizontal portion and pivoted thereon to swing through the frame for the purpose described, said bearing portion forming a support for the fabric, said tongue having an enlarged head of frictional material, the portions of said frame adjacent said horizontal portion extending angularly outwardly on opposite sides to form additional supporting portions for supporting and distributing the pull on the fabric, said angularly extending portions extending downwardly below said bearing portion whereby the fabric passing thereover exerts a pull to prevent the tongue from swinging upwardly.

7. A fabric supporter comprising a frame having a straight horizontal portion, a pendant tongue having a tubular bearing portion engaging said straight horizontal portion and pivoted thereon to swing through the frame for the purpose described, said bearing portion forming a support for the fabric, said tongue having an enlarged head of frictional material composed of rubber containing an embedded fibrous layer for frictionally gripping the fabric, the portions of said frame adjacent said horizontal portion extending angularly outwardly on opposite sides to form additional supporting portions for supporting and distributing the pull on the fabric.

8. A fabric supporter comprising a frame having a straight horizontal portion, a pendant tongue having a tubular bearing portion engaging said straight horizontal portion and pivoted thereon to swing through the frame for the purpose described, said bearing portion forming a support for the fabric, said tongue having an enlarged head of frictional material, the portions of said frame adjacent said horizontal portion sloping upwardly and outwardly therefrom to raise the fabric out of contact with said bearing portion and assist in supporting and distributing the pull on the fabric.

9. A fabric supporter comprising a hollow frame having a cylindrical axle at the lower end thereof, a pendant tongue having a tubular hub engaging said axle to swing through said frame for the purpose described, the normal diameter of said hub being smaller than that of said axle to cause constant friction between the two and thereby act as a brake on said tongue, the portions of said frame adjacent said axle sloping upwardly and outwardly on opposite sides to raise the fabric out of contact with the outer ends of said hub and axle and assist in supporting and distributing the pull on the fabric.

10. A fabric supporter comprising a frame having a straight horizontal portion, a pendant tongue having a tubular bearing portion engaging said straight horizontal portion and pivoted thereon to swing through the frame for the purpose described, said bearing portion forming a support for the fabric, said tongue having an enlarged head of frictional material, the portions of said frame adjacent said horizontal portion extending upwardly and outwardly on opposite sides to raise the fabric out of contact with said bearing portion and then downwardly to form recessed portions outwardly of said upward and outward sloping portions to assist further in supporting and distributing the pull on the fabric.

11. A fabric supporter comprising a frame having a pendant tongue pivoted on a portion thereof to swing through the frame for the purpose described, the portions of said frame adjacent said tongue pivot extending upwardly and outwardly on opposite sides to form additional supporting portions for raising the fabric out of contact with the tongue pivot.

HILDEGARD WIPPERMAN.